United States Patent [19]

Skogg

[11] Patent Number: 4,634,606

[45] Date of Patent: Jan. 6, 1987

[54] WASHABLE MARKING FLUID FORMULATION FOR SOFT GELATIN CAPSULES AND USE THEREOF

[75] Inventor: George A. Skogg, Kingsford, Mich.

[73] Assignee: The Nelson Paint Company, Kingsford, Mich.

[21] Appl. No.: 785,856

[22] Filed: Oct. 9, 1985

[51] Int. Cl.$^4$ .......................... B05D 7/24; B32B 1/06; C09D 11/00; F42B 13/36

[52] U.S. Cl. ..................................... 427/256; 102/502; 102/513; 106/19; 273/317; 273/428; 428/402

[58] Field of Search ........................ 106/19; 428/402; 427/256, 288; 102/502, 513; 273/317, 418, 428

[56] References Cited

U.S. PATENT DOCUMENTS

| | | | |
|---|---|---|---|
| 3,147,011 | 9/1964 | Lemelson | 273/418 |
| 3,429,263 | 2/1969 | Snyder et al. | 102/513 |
| 3,861,943 | 1/1975 | Grainger | 427/157 X |
| 4,170,669 | 10/1979 | Okada | 427/288 X |

OTHER PUBLICATIONS

Hawley, G. G., "The Condensed Chemical Dictionary", ninth edition, New York, Van Nostrand Reinhold Company, 1977, p. 332.

*Primary Examiner*—Evan K. Lawrence
*Attorney, Agent, or Firm*—Parmelee, Bollinger and Bramblett

[57] ABSTRACT

This invention relates to a washable marking fluid to be used in projectiles in which the prime and critical ingredient is a nonionic polyoxyethylene derivative of fatty acid partial esters of sorbitol anhydride. Projectiles produced from soft gelatin capsules containing such washable marking fluid possess ideal rheological properties and desired uniformity and stability. The fluid when packaged in a soft gelatin capsule produces projectiles that are more accurate and stable and make bright, highly visible marks that can be easily washed out with water and/or detergent and thus are ideally suitable for use in sports and games exercises.

20 Claims, No Drawings

WASHABLE MARKING FLUID FORMULATION FOR SOFT GELATIN CAPSULES AND USE THEREOF

FIELD OF THE INVENTION

This invention relates to projectiles for marking articles and the use thereof. More particularly, this invention relates to improved washable marking formulations for use in projectiles for marking articles.

BACKGROUND OF THE INVENTION

It has been known that articles can be conveniently marked by firing from a gun or like instrument a rupturable projectile containing a marking liquid. Such projectiles are designed to rupture or break on impact with the article to be marked. Such marking projectiles have generally comprised a soft gelatin capsule containing a marking liquid in the form of a liquid paint or paint-like composition. Such marking projectiles are disclosed, for example, in U.S. Pat. No. 3,861,943 issued Jan. 21, 1975 to Norman Grainger and assigned to R. P. Scherer Limited.

While the use of such projectiles for marking articles was a significant advance from the previous methods of dusting articles with powder or providing cuts in the articles in order to identify them, the use of such projectiles has not been entirely satisfactory for a number of reasons. For example, the commercially available marking formulations heretofore employed in the projectiles have generally been oil based paints, such as the pink-pigmented fluorescent oil-based paint mentioned in the aforementioned U.S. Pat. No. 3,861,943. When it is desired to produce only temporary or washable marks on articles such marking compositions are not biodegradable and thus could present undesirable environmental problems.

Also, projectiles containing such marking compositions have had undesirable shelf-life properties and tend to deteriorate on storage. Another significant drawback recognized with such projectiles is that the spherical gelatin capsules containing such marking liquids are not truly spherical but instead tend to become distorted in shape. Such projectiles are normally fired from a compressed gas gun, such as an air gun, and the distorted capsules are not accurately propelled due at least in part both to the escape of compressed gas around the distorted spherical capsule in the barrel of the gun and the curves and erratic turns caused by the distorted spherical capsule in flight.

Additionally, the poor suspension characteristics of the colorants in the marking liquids also has led to nonaccurate shooting of projectiles containing such marking liquids.

Moreover, the composition of such marking liquids has adversely affected the brittleness and friability characteristics of the projectiles leading to breaking of the projectiles during handling or firing of the gun or the projectile becoming not fragile enough to break when impacting the target article.

Other significant drawbacks to such prior marking liquids have been their toxicity and the undesirable presence of hydrocarbon, lower molecular weight alcohols, ketone, ester and chlorinated hydrocarbon solvents and heavy metal compounds which not only can cause softening and deterioration of soft gelatin capsules but also are not suitable for release into the environment.

It is therefore an object of this invention to provide marking compositions for incorporation into projectiles such as soft gelatin capsules, which marking compositions substantially eliminate the drawbacks and problems of the aforementioned marking compositions. A further objective of this invention is to provide projectiles that avoid the drawbacks and problems of the aforementioned projectiles.

SUMMARY OF THE INVENTION

Marking liquid formulations of this invention, designed to be incorporated into soft gelatin capsules to provide marking projectiles, comprise fluids containing nonionic polyoxyethylene derivatives of fatty acid esters of sorbitol anhydrides as the binding agent or vehicle, a colorant, a suspension agent and an antifoaming agent. Such marking liquid formulations are incorporated into soft gelatin capsules immediately before they are sealed thereby providing marking projectiles that may be used, in the method of the invention, for temporarily marking articles of any kind, both animate and inanimate, with a marking composition that is washable in water and/or water and detergent.

DETAILED DESCRIPTION OF THE INVENTION

Washable marking fluid compositions of this invention generally comprise about 94 to about 99% by weight of a nonionic polyoxyethylene derivative of fatty acid partial ester of sorbitol anhydride, about 0.5 to about 5.0% by weight of a colorant, about 0.3% to about 3.0% by weight of a suspending (or anti-settling) agent and about 0.05% to about 0.8% by weight of an antifoaming agent, wherein the percentages by weight are based on the weight of the total marking fluid composition.

Nonionic polyoxyethylene derivatives of fatty acid and partial esters of sorbitol anhydride suitable for use as the vehicle or binding agent in the composition of this invention are products of the following general structural formula

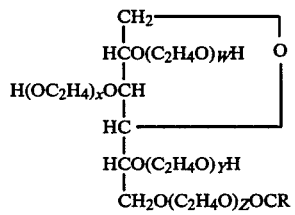

wherein OCR is a fatty acid radical such as for example, a laurate, palmitate, stearate or oleate radical and the like. Such products are generally mixtures with respect to the length of the polyoxyetheylene chain, that is the $-(C_2H_4O)-$ chain; the $(W+X+Y+Z)$ value representing the average number of the ethylene oxide units in the ether side chain of each product. For the products useful in the compositions of this invention $(W+X+Y+Z)$ will generally be no less than about 12 and no more than about 26 and such products will have an HLB (Hydrophile-Liphophile Balance) of not less than about 10 and not more than about 19. Such polyoxyethylene derivatives of fatty acid esters of sorbitol anhydride are available from a wide source of manufacturers. Such products are known as polysorbates. As examples of such polysorbates there may be mentioned, for example, polysprbate 20, polysorbate 40, polysorbate 60, polysorbate 80 and the like which are described in the CTFA Cosmetic Ingredients Dictionary, 3 Edition, pages 246–247 (1982). Especially preferred, however, for use as a vehicle binding agent for the marking compositions of this invention is polyoxyethylene derivative of fatty and acid partial esters of sorbitol anhydride having an average number of ethylene oxide units in the ether side chain of 18 to 22 and a HLB of 16.7.

Any suitable suspending agent which does not adversely affect the soft gelatin capsule may be employed in the marking compositions of this invention. It is preferred, however, to employ suspending agents such as modified hydrous silicates, hydrated alumina silicates, fumed silica and organic derivatives of hydrous magnesium aluminum silicates.

Likewise, any suitable commercially available antifoam agents which do not adversely affect the soft gelatin capsule of the projectile may be employed in the marking fluid compositions of this invention. For example, antifoam agents which are compositions of nonionic surfactant and a metallic soap in a hydrocarbon base and marketed as Troykyd Defoamers by Troy Chemical Corporation may be employed as the antifoam agent. Also, Dow Corning's Antifoam A silicone may be employed.

As colorants for use in the marking fluids, it is especially desirable to employ dry organic and inorganic colored pigments for brightness and their high degree of visibility. However, the pigments should not contain heavy metals such as lead, mercury and the like. Such pigments, especially those considered to be non-toxic are preferred, such as, for example, Toluidene Red Toner, Phthalocyanine Green and Phthalocyanine Blue, Titanium Dioxide, Yellow Iron Oxide and the like.

As the examples of an especially preferred washable marking composition of this invention there may be mentioned the following exemplary formulations:

| Component | Percent by Weight |
| --- | --- |
| Polyoxyethylene (20) sorbitol monolaureate | 94–99% |
| Colorant | .05–5.0% |
| Suspending agent | .03–3.0% |
| Antifoam agent | 0.05–0.80% |

As will be appreciated, the above formulations are merely exemplary of the marking fluid formulations of this invention and that various other polyoxyethylene derivatives of fatty acid partial esters of sorbitol anhydride, colorants, suspending agents and antifoaming agents may be employed in such formulations. Various suspending and antifoaming agents will be employed in combinations to produce top quality marking projectiles with ideal rheological properties and desired uniformity and stability.

The projectiles of this invention containing the washable marking fluid formulations are preferably the well-known soft gelatin capsules. Such soft gelatin capsules and their production are well known.

Moreover, their use as marking projectiles is also known as disclosed in the earlier mentioned Grainger patent. However, when the marking fluid of this invention is incorporated into such soft gelatin capsules, the resulting projectiles or pellets are ones of greatly improved properties and performance in use.

As indicated, the manufacture of soft gelatin capsules is known in the art and as such the manufacture thereof does not, per se, form a part of this invention. Merely as exemplary of a suitable formulation employed to form such a soft gelatin capsule suitable for use as an enclosure for the marking fluids of this invention there may be mentioned for example, the following exemplary soft gelatin capsule formulation:

| Component | Parts by Weight |
| --- | --- |
| Dry gelatin powder | 44.75 |
| Glycerine | 8.75 |
| Sorbitol (70% Syrup) | 12.00 |
| Water | 34.50 |

Soft gelatin capsules can be produced form this or other soft gelatin capsule producing formulations according to any of the acceptable methods known in the art for production of such capsules. Such methods are disclosed, for example, at page 699 of the United States Pharmacopeia XIX (1975) and at pages 929–930 of the National Formulary XIV (1975).

For use as projectiles in accordance with this invention the gelatin capsules can be formed into spherical or oblong capsules, but are preferably spheres. The spherical capsules are preferably spheres of from about ½ to about 1 inch in diameter, most preferably about 7/10 to ¾ inch. If oblong, the capsules are preferably of a length of about ¾ to 1¼ inch. The soft gelatin capsules useful as projectiles according to this invention will have a skin thickness preferably of from about 0.01 to about 0.03 inch thick, most preferably about 0.013 inch thick.

As indicated, such soft gelatin capsules can be manufactured by conventional soft gelatin manufacturing techniques generally employed for liquid-filled capsules. A liquid gelatin mix is prepared, formed into a capsule on any suitable capsule forming machine and generally from about 0.25 to about 1.25 cc, the marking liquid formulations of this invention is injected into the capsules immediately before they are sealed. The novel marking fluid formulations of this invention permit better processing of the capsules in current production machinery due to the good rheological properties such as flow, good cut off, cleaning and the like which are conducive to trouble free production.

The novel washable marking fluid formulations of this invention, as described hereinbefore, are compatible with the soft gelatin capsule and will not interact with the walls of the capsule to cause rupture or distortion of the capsule or seepage of the fluid from the capsule. Moreover, the marking fluid formulations have a pH that is nearly neutral which is highly desirable.

The soft gelatin capsules filled with the washable marking fluid formulations of this invention may be propelled from a gun or any other projecting instrument such as compressed gas guns, for example, air guns, rifles or pistols, and sling shots or the like.

The capsules of this invention are characterized by ideal rheological properties and greatly improved uniformity and stability upon storage. The capsules are characterized by the fact that truer spheres are produced which are not distorted as with previously available spherical marking capsules.

Since the filled capsules of this invention are less likely to be distorted, the capsules are not subject to the curving and erratic turns in flight that occur with previously available capsules. Likewise, since the capsules of this invention do not suffer from the softening and deterioration of the capsule walls as with previously filled marking capsules, the filled capsules of this invention are characterized by superior brittleness and friability characteristics and do not break in handling or in the firing of the projecting instrument yet are fragile enough to break upon impacting the article to be marked.

Significantly, the filled capsules of this invention provide marking capsules that enable one to mark articles with a bright, highly visible mark yet is a mark that can be washed out with water and/or water and detergent. As such, such capsules are highly desirable for use in the so-called "war games", sports or similar game exercises where marking a target is important.

Another characteristic of the capsules filled with the marking fluid formulations of this invention is the improved suspension characteristics of the colored pigments. This improved suspension characteristic results in a more uniform sphere and thus in more accurate propelling of the capsule when it is discharged from the projecting instrument.

It will be appreciated that the hereinbefore description and examples of the invention are merely exemplary of the scope of the invention and that various modifications thereof will be apparent to those skilled in the art.

I claim:

1. A washable marking fluid formulation comprising from about 94 to about 99% vt weight of a nonionic polyoxyethylene derivative of fatty acid partial esters of sorbitol anhydride, about 0.5 to about 5.0% by weight of a colored pigment, about 0.3 to about 3.0% by weight of a suspending agent and about 0.05 to about 0.8% by weight of an antifoaming agent, wherein the percentages by weight are based on the weight of the total marking fluid composition.

2. A formulation of Claim 1 wherein the nonionic polyoxyethylene derivative of fatty acid partial esters sorbitol anhydride has the formula

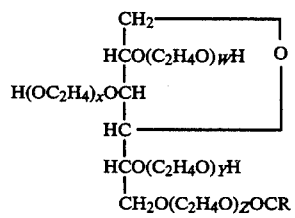

wherein OCR is fatty acid radical selected from the group consisting of a laurate, palmitate, stearate and oleate radical, $(W+X+Y+Z)$ is a number of no less than about 12 and no more than about 26 and such derivative has an HLB value of not less than about 10 and not more than about 19.

3. A formulation of Claim 2 wherein OCR is a laurate radical, $(W+X+Y+Z)$ has a value of 18 to 22 and the HLB value is about 16.7.

4. A formulation of claim 2 wherein the suspending agent is a fumed silica.

5. A formulation of claim 2 wherein the suspending agent is an organic derivative of hydrous magnesium aluminum silicate.

6. A formulation of claim 3 wherein the suspending agent is a fumed silica.

7. A formulation of claim 3 wherein the suspending agent is an organic derivative of hydrous magnesium aluminum silicate.

8. A washable marking fluid formulation comprising:

| Component | Percent by Weight |
|---|---|
| Polyoxyethylene (20) sorbitol monolaureate | 94–99% |
| Colored Pigment | 0.5–5.0% |
| Suspending Agent | 0.3–3.0% |
| Antifoam Agent | 0.05–0.80% | wherein the polyoxyethylene (20) sorbitol monolaurate has 10 to 22 ethylene oxide units in the ether side chain and a HLB value of 16.7.

9. A soft gelatin marking capsule comprising a soft gelatin capsule containing a washable marking fluid formulation of claim 1.

10. A soft gelatin marking capsule comprising a soft gelatin capsule containing a washable marking fluid formulation of claim 2.

11. A soft gelatin marking capsule comprising a soft gelatin capsule containing a washable marking fluid formulation of claim 3.

12. A soft gelatin marking capsule comprising a soft gelatin capsule containing a washable marking fluid formulation of claim 5.

13. A soft gelatin marking capsule comprising a soft gelatin capsule containing a washable marking fluid formulation of claim 8.

14. A soft gelatin capsule of claim 13 wherein the soft gelatin capsule is spheroidal in shape.

15. A method of marking an article with a washable marking fluid which comprises projecting a soft gelatin capsule of claim 9 from a projecting instrument, said capsule rupturing only on impact with the article to thereby mark it with the washable marking fluid formulation contained in the capsule.

16. A method of marking an article with a washable marking fluid which comprises projecting a soft gelatin capsule of claim 10 from a projecting instrument, said capsule rupturing only on impact with the article to thereby mark it with the washable marking fluid formulation contained in the capsule.

17. A method of marking an article with a washable marking fluid which comprises projecting a soft gelatin capsule of claim 11 from a projecting instrument, said capsule rupturing only on impact with the article to thereby mark it with the washable marking fluid formulation contained in the capsule.

18. A method of marking an article with a washable marking fluid which comprises projecting a soft gelatin capsule of claim 12 from a projecting instrument, said capsule rupturing only on impact with the article to thereby mark it with the washable marking fluid formulation contained in the capsule.

19. A method of marking an article with a washable marking fluid which comprises projecting a soft gelatin capsule of claim 13 from a projecting instrument, said capsule rupturing only on impact with the article to thereby mark it with the washable marking fluid formulation contained in the capsule.

20. A method of marking an article with a washable marking fluid which comprises projecting a soft gelatin capsule of claim 14 from a projecting instrument, said capsule rupturing only on impact with the article to thereby mark it with the washable marking fluid formulation contained in the capsule.

* * * * *